US006502828B1

United States Patent
Sasaki (10) Patent No.: US 6,502,828 B1
(45) Date of Patent: Jan. 7, 2003

(54) END SEAL (75) Inventor: Kenji Sasaki, Shizuoka-ken (JP)

(73) Assignee: NDK Corporation, Tokyo (JP)

( * ) Notice: Subject to any disclaimer, the term of this patent is extended or adjusted under 35 U.S.C. 154(b) by 0 days.

(21) Appl. No.: 09/417,748

(22) Filed: Oct. 14, 1999

(30) Foreign Application Priority Data

Oct. 15, 1998 (JP) .......................................... 10-293465
Mar. 26, 1999 (JP) .......................................... 11-083246

(51) Int. Cl.$^7$ ................................................ F16L 55/04
(52) U.S. Cl. .......................................... 277/590; 138/30
(58) Field of Search .................................. 277/630, 639, 277/641, 644, 607, 609, 628, 590; 138/30

(56) References Cited

U.S. PATENT DOCUMENTS

| 3,326,241 A | * | 6/1967 | Mercier | ....................... 138/30 |
|---|---|---|---|---|
| 4,080,996 A | * | 3/1978 | Zahid | ............................ 138/30 |
| 4,338,968 A | * | 7/1982 | Mercier | ....................... 138/30 |
| 4,386,627 A | * | 6/1983 | Lachaux | ....................... 138/30 |
| 4,526,205 A | * | 7/1985 | Sugimura | ..................... 138/30 |
| 4,628,964 A | * | 12/1986 | Sugimura | ..................... 138/30 |
| 4,637,435 A | * | 1/1987 | Chirdon | ....................... 138/30 |
| 4,671,325 A | * | 6/1987 | Otter | ............................ 138/30 |
| 4,907,621 A | * | 3/1990 | Sugimura | ..................... 138/30 |

FOREIGN PATENT DOCUMENTS

JP          64-65340          10/1989

* cited by examiner

Primary Examiner—J. J. Swann
Assistant Examiner—Matthew E. Rodgers
(74) Attorney, Agent, or Firm—Jacobson Holman PLLC (57) ABSTRACT

An end seal seals between an end portion and an operating member moving toward the end portion. The end seal has a seal member mounted on the end portion. A seal lip pressed by sealing fluid pressure to come in contact with the operating member when the operating member comes in contact with the end portion and stops is provided on the seal member.

9 Claims, 9 Drawing Sheets

FIG. 9

# END SEAL

TECHNICAL FIELD

The present invention relates to an end seal which is one kind of a sealing device.

PRIOR ART

Figure 9:
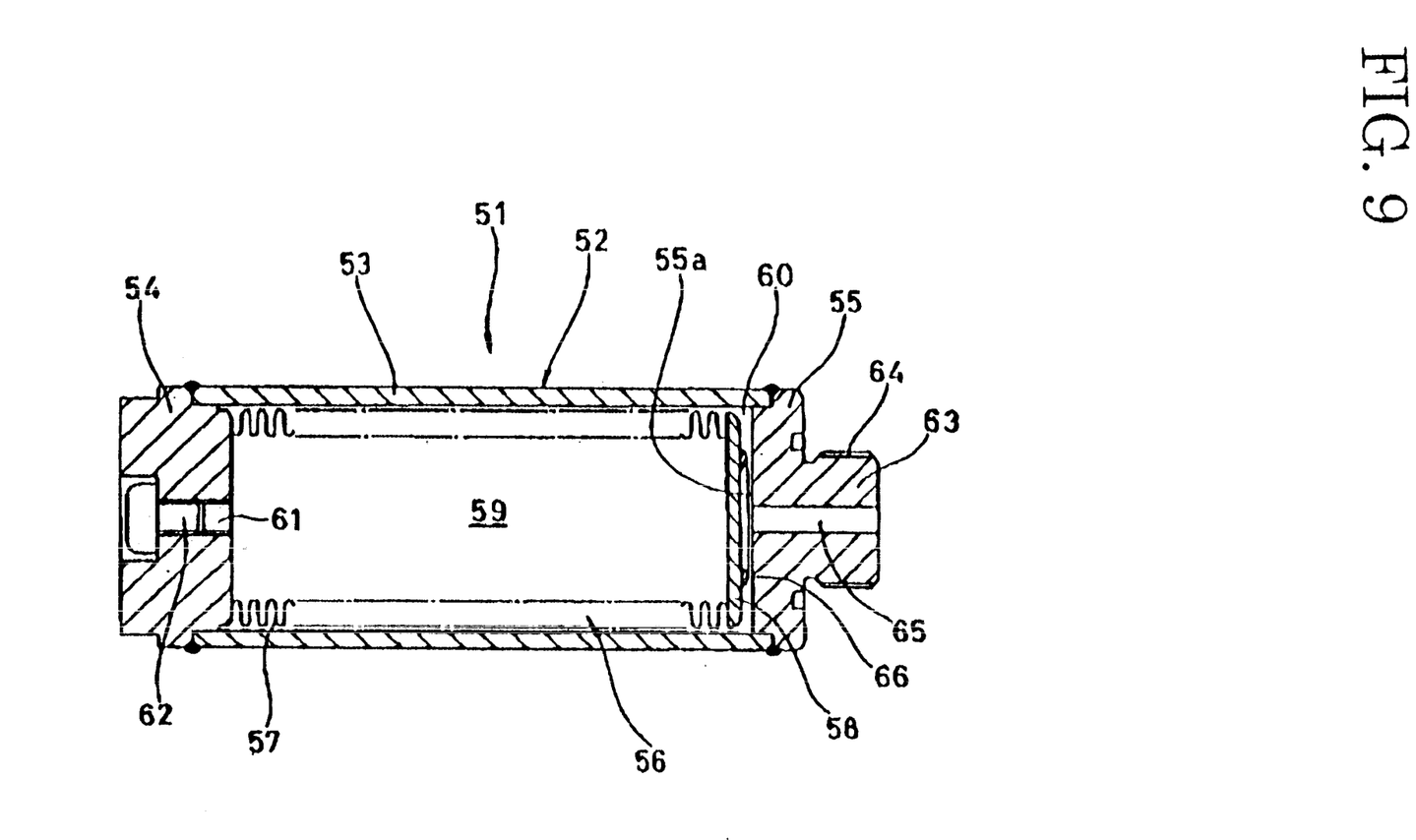
FIG. 9 is a sectional view of an accumulator having an end seal mounted thereon according to prior art.

As a pressure apparatus provided with an end seal, an accumulator 51 shown in FIG. 9 has been heretofore known, the accumulator being constituted as described below.

That is, first, cover members 54, 55 are welded and secured to opposite ends of a tubular shell 53 to provide a housing 52, the housing 52 housing therein an operating member 56 provided with a bellows 57 and an end member 58. The bellows 57 has one end secured to one cover member 54, and the other end secured to the end member 58, whereby the interior of the housing 52 is divided by the bellows 57 and the end member 58 into an internal gas chamber 59 and an external pressure chamber 60 of the bellows 57 and the end member 58.

One cover member 54 on the left side in the figure is provided with an injection hole 61 for injecting gas into a gas chamber 59, and a plug member 62 for closing the injection hole 61 is mounted on the injection hole 61. Accordingly, the plug member 62 is removed and gas having predetermined pressure is injected into the gas chamber 59 from the injection hole 61. After injection, the injection hole 61 is closed by the plug member 62 to thereby seal the gas having predetermined pressure into the gas chamber 59.

Further, the other cover member 55 on the right side in the figure is provided with a mounting portion 63 provided with a thread portion 64 for connecting the accumulator 51 to a pressure pipe such as an oil pressure pipe not shown, and with a pressure introducing port 65 for introducing pressure within the pressure pipe into a pressure chamber 60. Accordingly, the accumulator 51 is connected to the pressure pipe in the mounting portion 63 so that the pressure within the pressure pipe is introduced from the pressure introducing port 65 into the pressure chamber 60.

The accumulator 51 provided with the above-described constitution has a function to absorb a pulsation of pressure generated, for example, in the pressure pipe by keeping the balance between the sealed gas pressure in the gas chamber 59 and the pressure in the pressure chamber 60. However, when the pressure within the pressure chamber 60 during operation, that is, the pressure within the pipe should extremely lower, the bellows 57 is inflated due to a pressure difference between the inside and the outside to possibly be buckled and broken.

Accordingly, in the above-described accumulator 51, measures therefor are taken such that an end seal 66 is mounted on the end of the end member 58 by a baking means so that the pressure in the pressure chamber 60 is not lowered to a level below a predetermined value by the sealing action of the end seal 66. That is, when the pressure in the pressure chamber 60 lowers during operation, the bellows 57 extends so long that the end seal 66 mounted on the end of the end member 58 comes in close contact with an end portion 55a of the other cover member 55, and therefore, the pressure chamber 60 is intercepted from the pressure introducing port 65 by the sealing action of the end seal 66 caused by the close contact. Accordingly, even if the pressure in the pressure pipe further lowers after the interception, the pressure in the pressure chamber 60 is not lowered to thereby keep the balance between the sealed gas pressure in the gas chamber 59 and the pressure in the pressure chamber 60 to prevent the bellows 57 from being inflated.

However, in the above-described conventional accumulator 51, it is set so that the end seal 66 is mounted on the end of the end member 58 as mentioned above, and the end seal 66 is sandwiched between the end portion 55a of the cover member 55 and the end member 58 being moved toward the end portion 55a due to the predetermined pressure difference. Therefore, the end seal 66 is sandwiched between the end portion 55a and the end member 58 in a compressed state to receive large load, which is repeated every expansion and contraction of the bellows 57 resulting from a pressure variation, resulting in an inconvenience that a phenomenon of a permanent set of fatigue occurs relatively early in the end seal 66 whereby the sealing performance of the end seal 66 rapidly lowers.

SUMMARY OF THE INVENTION

A first object of the present invention is to improve an end seal for sealing an end of a pressure apparatus such as an accumulator and other apparatuses.

A second object of the present invention is to prevent an early occurrence of a permanent set of fatigue in a seal member.

A third object of the present invention is to provide an end seal capable of securing the stable sealing performance for a long period of time.

A fourth object of the present invention is to provide an end seal having construction in which a seal is hard to be removed from a housing.

An end seal according to one form of the present invention comprises an end seal for sealing between an end portion and an operating member moving toward said end portion. There is a seal member mounted on said end portion. When said operating member comes in contact with said end portion and stops or is stopped by a stopper, a seal lip pressed by sealing fluid pressure into close contact with said operating member is provided on said seal member.

In an end seal according to a further form of the present invention, an annular rigid member is provided on the inner peripheral side of a seal member, and an outer peripheral surface of an extreme end of said rigid member arranged on the inner peripheral side of a seal lip of said seal member is formed in the form of a divergent taper adjusting to a shape of said seal lip.

An end seal according to another form of the present invention comprises an end seal for sealing between an end portion of a housing and an operating member moving toward said end portion. There are provided a seal member inserted in a non-adhesive manner into a recessed seal mounting portion provided on said end portion, and an annular rigid member secured to said housing on the inner peripheral side of said seal member. When said operating member comes in contact with said end portion and stops or is stopped by a stopper, a seal lip pressed by sealing fluid pressure into close contact with said operating member is provided on said seal member. On said rigid member is provided a divergent tapered extreme end positioned on the inner peripheral side of said seal lip to backup said seal lip and to prevent said seal member from slipping out from said seal mounting portion.

In an end seal according to another form of the present invention, a rigid member is inserted into a fluid flow passage provided in a housing, and a difference in-level locating portion provided on the outer peripheral surface of said rigid member runs into a difference in-level locating portion provided on the inner surface of said fluid flow passage to thereby specify the inserting depth of said rigid member.

In an end seal according to still another form of the present invention, a rigid member is inserted into a fluid flow passage provided in a housing, and a proximal end of said rigid member positioned forwardly of an inserting direction is enlarged in diameter after insertion into engagement with said housing to thereby prevent said rigid member for slipping out from said fluid flow passage.

In the above-described end seal, the seal member is mounted not on the operating member on the moving side but on the end portion on the stationary side. Moreover, in a state that the operating member moving toward the end portion comes in contact with the end portion and stops, or is stopped by a stopper separately provided on the end portion, a seal lip of the seal member of said end seal is pressed by the sealing fluid pressure into close contact with the operating member to thereby provide the sealing action. Accordingly, sealing is not done in a state that the seal member is strongly sandwiched between rigid materials but is done in a state that a seal lip of the seal member is in close contact with the already stopped moving member under predetermined contact pressure, thus making it possible to prevent an occurrence of early permanent set of fatigue in the seal member provided with the seal lip.

In the case where the present invention is applied to the accumulator which is a pressure apparatus as described above, the end seal is mounted on the end portion of the housing of the accumulator corresponding to the end portion. In this case, preferably, with respect to materials for the seal member or the seal lip, EPDM or the like is used when a pressure element (sealing fluid or object fluid) introduced into a pressure chamber of the accumulator, and rubber such as NBR is used when it is mineral oil. Further, preferably, with respect to the hardness of the seal member or the seal lip, in consideration of anti-protrusion of the seal lip against high pressure, this is set relatively high.

In addition to the above, in the end seal mentioned above, the outer peripheral surface of the extreme end of the rigid member formed into a divergent taper displays the action for backing up the seal lip to thereby prevent the seal lip from being inverted on the inner peripheral side. Further, the maximum outside-diameter dimension of the outer peripheral surface of the extreme end of the rigid member formed into the divergent taper is set larger than the minimum inside-diameter dimension of the seal member whereby the outer peripheral surface of the extreme end of the rigid member displays the anti-slip action to prevent the seal member from being detached from the mounting portion of the end portion.

In the above-described end seal, the seal member is inserted into not the operating member on the moving side but into the recessed seal mounting portion provided on the end portion of the housing on the stationary side in a non-adhesive manner. Moreover, in the state that the operating member moving toward the end portion comes in contact with the end portion and stops, or is stopped by a stopper separately provided with respect to the end portion, the seal lip of the seal member of the end seal is pressed by the sealing fluid pressure into close contact with the operating member to thereby display the sealing action. Accordingly, the seal member is not sealed in the state that the former is strongly sandwiched between the rigid materials but is sealed in the state that the seal lip of the seal member is in close contact with the already stopped moving member under the predetermined contact pressure, thus making it possible to prevent an occurrence of early permanent set of fatigue in the seal member provided with the seal lip. Furthermore, because the divergent tapered extreme end positioned on the inner peripheral side of the seal lip to back up the seal lip and prevent the seal member from slipping out from the seal mounting portion is provided on the annular rigid member secured to the housing on the inner peripheral side of the seal member, the presence of the tapered rigid extreme end enables prevention of the seal lip from being inverted, and enables prevention of the seal member from being detached from the mounting portion of the housing.

In addition to the above, according to the above-described end seal, the locating action by way of the protrusion between the difference in-level locating portion provided on the outer peripheral surface of the rigid member and the difference in-level locating portion provided on the inner surface of the fluid flow passage enables accurate provision of a height position of the rigid member with respect to the end portion of the housing.

Furthermore, the engaging action of the proximal end of the rigid member enlarged in diameter after insertion enables fixing the rigid member to the housing in a strongly anti-slipped state.

BRIEF DESCRIPTION OF THE DRAWINGS

FIGS. 8(A), (B) and (C) are respectively sectional views showing a fixing method for an end seal.

EMBODIMENTS

Embodiments of the present invention will be explained hereinafter with reference to the drawings.

Embodiment 1

Figure 1:
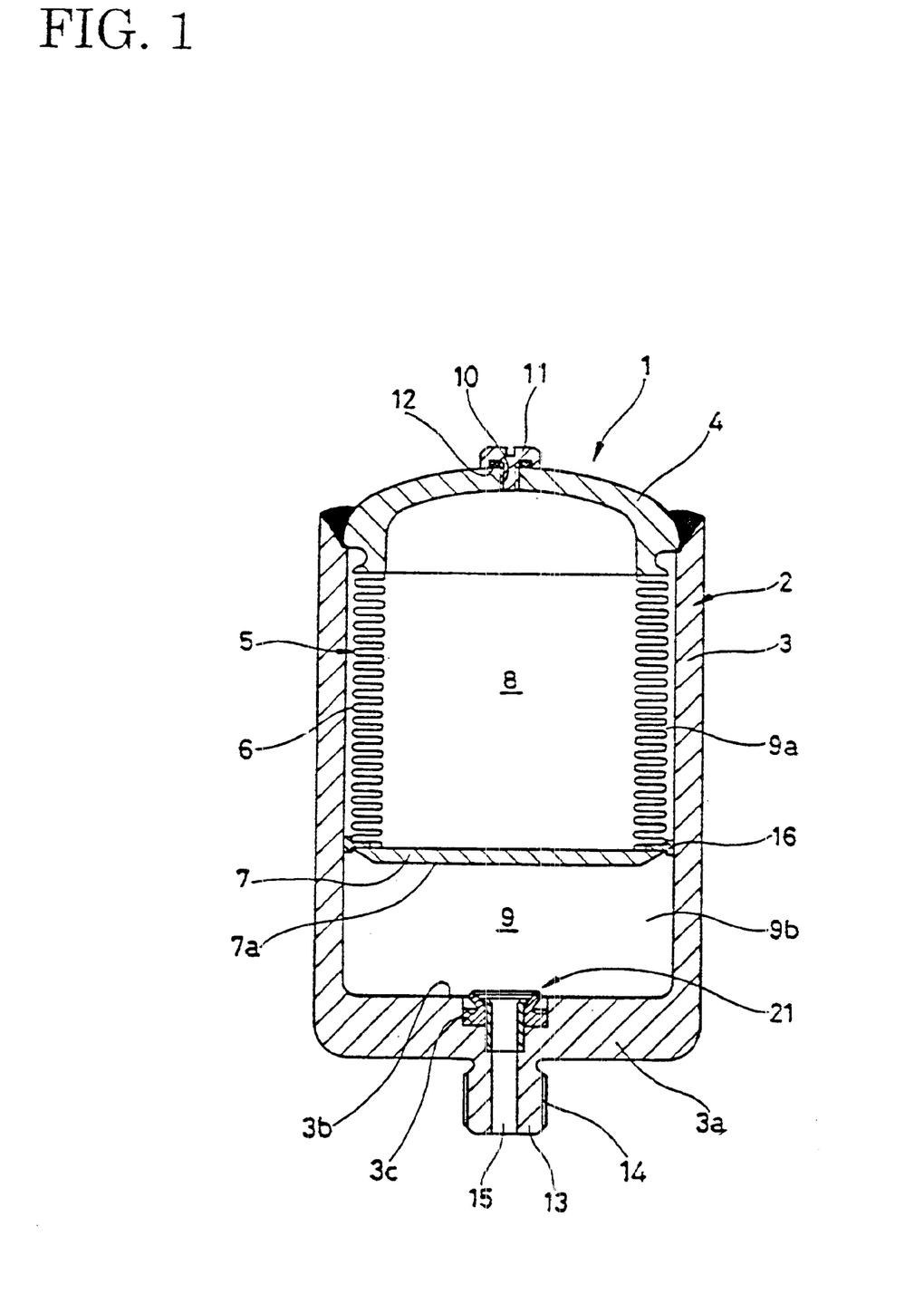
FIG. 1 is a sectional view of an accumulator having an end seal mounted thereon according to Embodiment 1 of the present invention.
Figure 2:
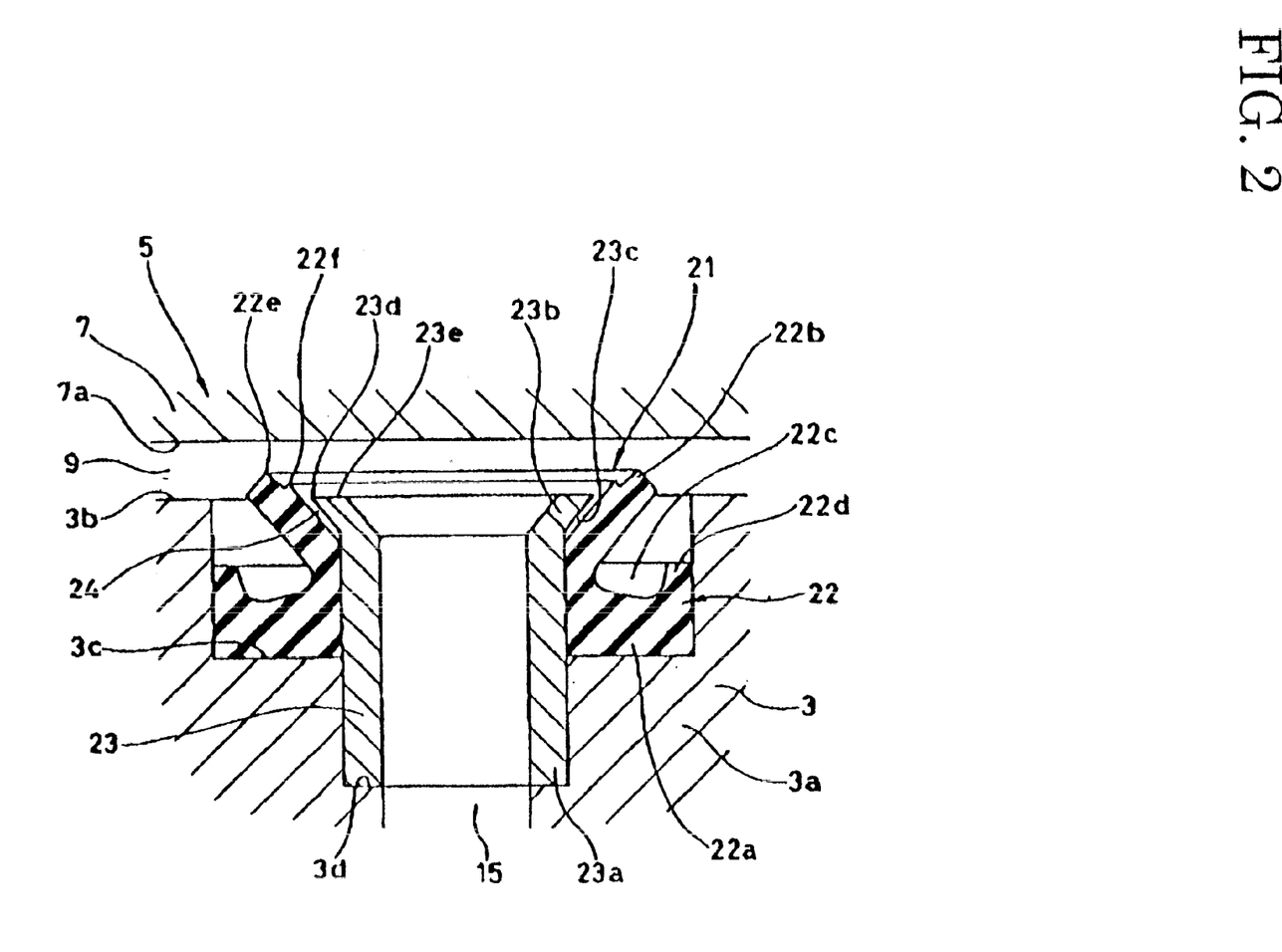
FIG. 2 is an enlarged sectional view of the end seal.

FIG. 1 shows a section of a metal bellows type accumulator 1 having an end seal 21 mounted thereon according to Embodiment 1. FIG. 2 is an enlarged sectional view of the end seal 21.

In the accumulator 1 shown in FIG. 1, first, a cover member (also referred to as an end cover or a gas end cover) 4 is welded and fixed to an open end of a closed-end tubular shell 3 to provide a housing 2, in which is housed an operating member 5 provided with a bellows 6 and an end member (also referred to as a bellows cap) 7. The bellows 6 has one end secured to the cover member 4, and the other end secured to the end member 7, whereby the interior of the housing 2 is divided by the bellows 6 and the end member 7 into an internal gas chamber 8 and an external pressure chamber (also referred to as a fluid chamber) 9 of the bellows 6 and the end member 7. For the bellows 7, metal bellows such as an electro-deposited bellows, a molded bellows or a welded bellows and so on are used, but bellows formed of other material can be also used according to the specifications and uses of the accumulator 1. The end member 7 may be molded integral with the bellows 6.

An injection port 10 for injecting gas in the gas chamber 8 is provided in the cover member 4 on the upper side in the figure, and on the injection port 10 is mounted a screwed-in type plug member (also referred to as a gas plug) provided with a packing 12 such as an O-ring for closing the injection port 10. Accordingly, the plug member 11 is removed to inject gas having predetermined pressure into the gas chamber 8 from the injection port 10, and after injection, the injection port 10 is closed by the plug member 11 to thereby seal the gas having predetermined pressure into the gas chamber 8. The kind of gas to be injected is preferably nitrogen gas, inactive gas or the like.

A mounting portion 13 provided with a thread portion 14 for connecting the accumulator 1 to a pressure pipe such as an oil pressure pipe not shown is provided on an end wall 3a of a shell 3 on the lower side in the figure, and a pressure introducing port (also referred to as a fluid flow passage) 15 for introducing pressure in the pressure pipe into a pressure chamber 9 is provided. Accordingly, the accumulator 1 is connected to the pressure pipe in the mounting portion 13 to introduce the pressure in the pressure pipe into the pressure chamber 9 from the pressure introducing port 15.

An annular sliding member (also referred to as a vibration damping ring) 16 is mounted on the outer peripheral side of the other end of the bellows 6 secured to the end member 7 or on the outer peripheral side of the end member 7, and when the bellows 6 expands and contracts, and when the end member 7 moves, the sliding member 16 slidably moves in its outer peripheral portion with respect to the inner peripheral surface of the shell 3. Accordingly, by guidance of sliding movement of the sliding member 16, the end member 7 moves parallel with the inner peripheral surface of the shell 3 and the bellows 6 expands and contracts parallel with the inner peripheral surface of the shell 3, to thereby prevent the end member 7 or the bellows 6 from galling the inner peripheral surface of the shell 3. It is noted that the sliding member 16 is provided with a pressure communication portion not shown so that the pressure chamber 9 is not divided by the sliding member 16 into a space 9a on the outer peripheral side of the bellows 6 and a space 9b on the lower side in the figure of the end member 7.

A seal mounting portion 3c in the form of an annular recessed portion is provided in the inner surface of an end wall 3a of the shell 3, that is, an end portion 3b and in an open peripheral edge of the pressure introducing port 15, and an end seal 21 is mounted on the seal mounting portion 3c.

The end seal 21 is constituted as follows:

That is, as shown in FIG. 2 in an enlarged scale, an annular seal member (also referred to as a lip seal) 22 formed of a predetermined rubberlike elastic material is pressed into the seal mounting portion 3c of the shell 3, and an annular or tubular rigid member (also referred to as an annulus or a pipe) 23 formed of predetermined metal or resin or the like is arranged on the inner peripheral side of he seal member 22. A rigid member mounting portion 3d in the form of an annular difference in-level for pressing in and securing the rigid member 23 is provided on the inner peripheral side of the seal mounting portion 3c. From a viewpoint of the procedure for assembling and mounting the end seal 21, preferably, the seal member 22 is first pressed into the outer periphery of the rigid member 23, after which the rigid member 23 is fitted into the mounting portion 3d.

The seal member 22 is first provided with an annular base portion 22a pressed into and secured to the seal mounting portion 3c in a nonadhesive manner, and on the end on the end member 7 side of the base portion 22a is integrally molded an annular seal lip (also referred to as an inner peripheral seal lip or a first seal lip) 22b in contact with an end 7a of the end member 7 in a manner of freely moving away therefrom. An annular recessed portion 22c is formed on the outer peripheral side of the seal lip 22b, and an outer peripheral seal lip (also referred to as a second seal lip) 22d always in close contact with the inner surface of the seal mounting portion 3c is molded integral with the outer peripheral side of the recessed portion 22c.

Figure 3:
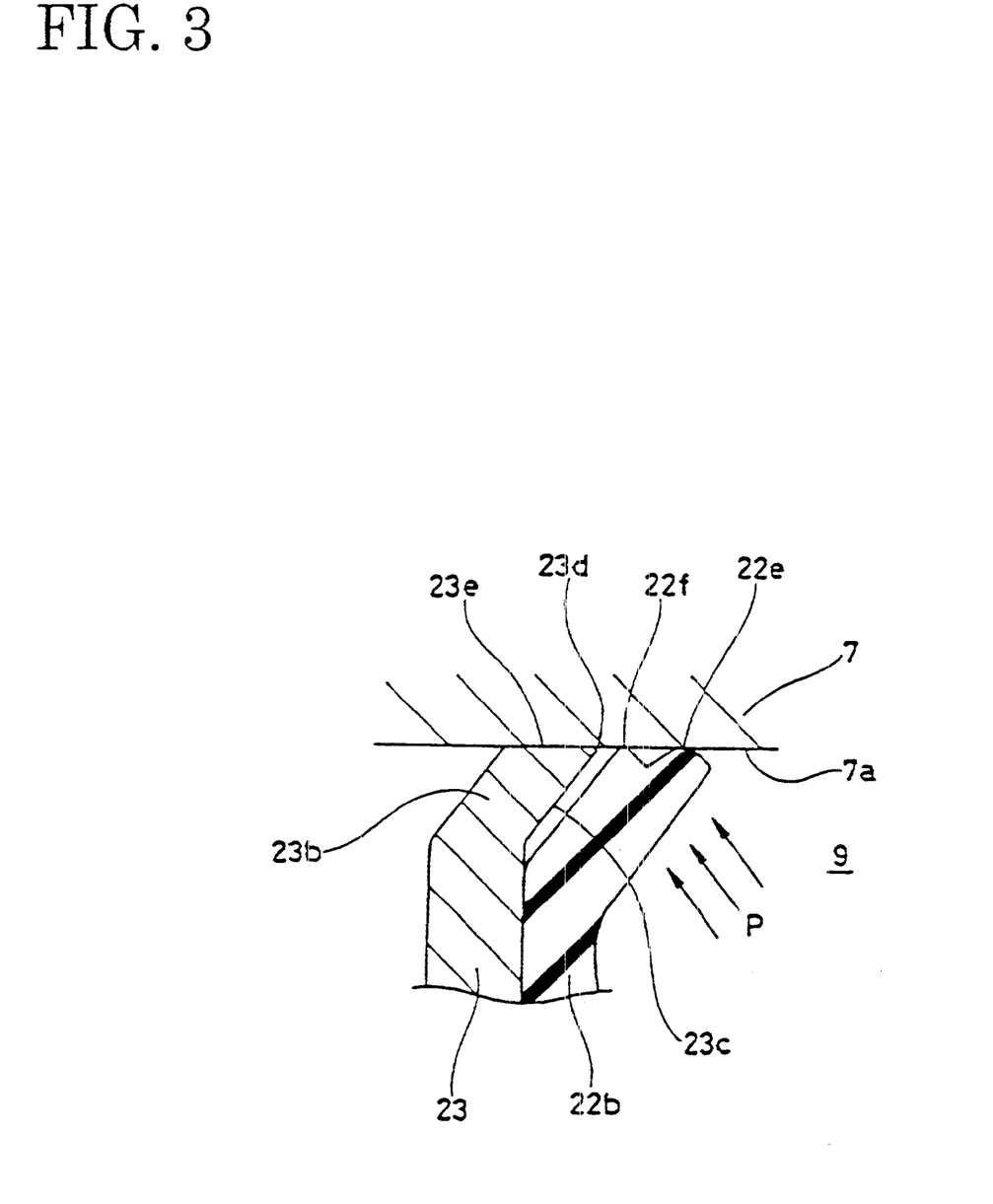
FIG. 3 is a partly enlarged sectional view showing an operating state of the end seal.
Figure 4:
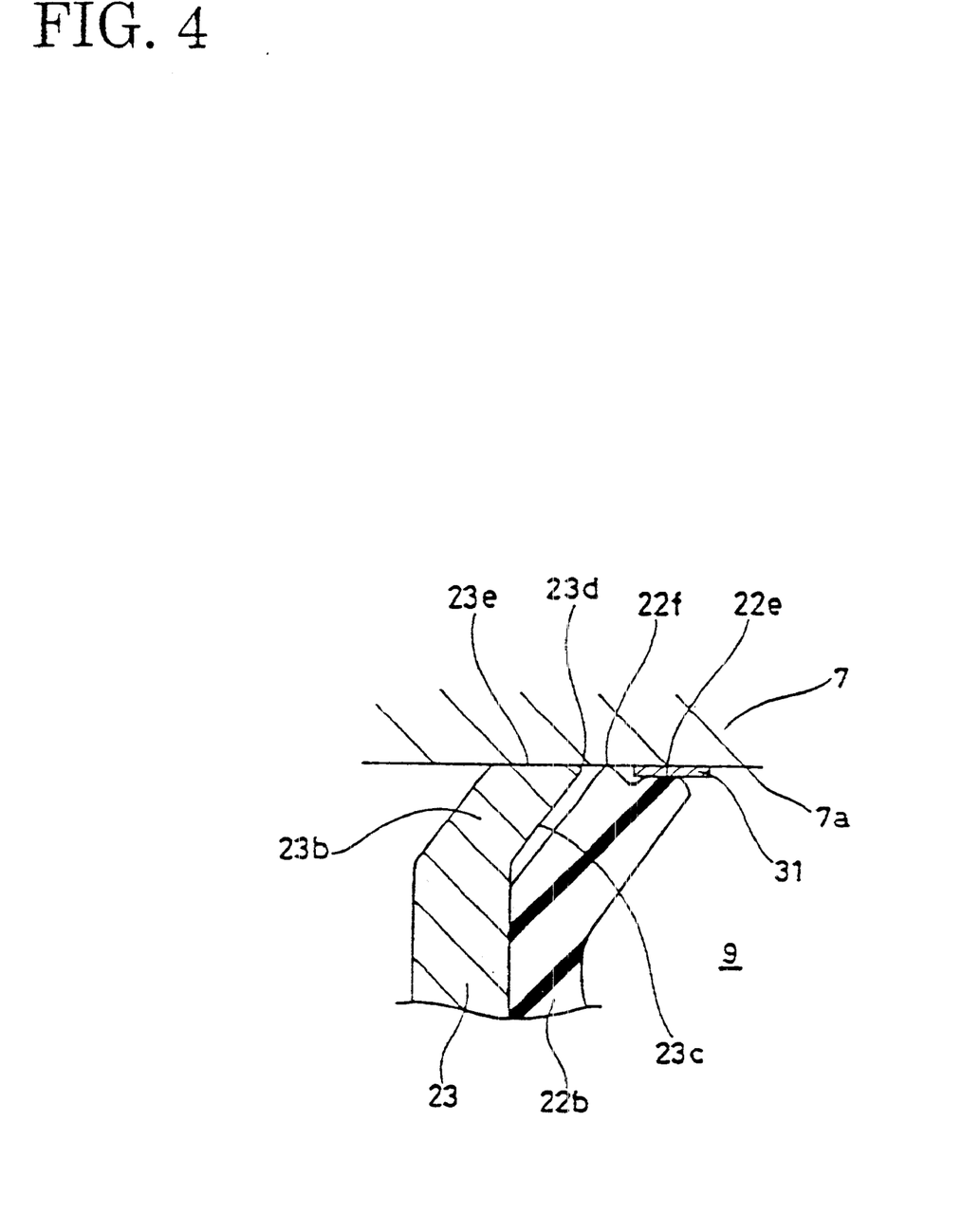
FIG. 4 is a partly enlarged sectional view showing an operating state of the end seal.

The seal lip 22b is formed as a seal lip of an outward shape directed outward in a diametral direction from the proximal end to the extreme end, as shown in the figure, and as shown in FIG. 3, when the seal lip 22b comes in contact with the end 7a of the end member 7, it is pressed by pressure P of the pressure chamber 9 which is a sealing fluid pressure and pressed against the end 7a and comes in close contact therewith. Accordingly, the outer peripheral surface of the seal lip 22b serves as a pressure receiving surface. Further, two seal protrusions 22e, 22f in the form of annulus are concentrically provided on the extreme end of the seal lip 22b, and as shown in FIG. 3, the seal protrusions 22e, 22f come in close contact with the end 7a of the end member 7. As shown in FIG. 4, in this case, even if a foreign matter 31 in the fluid galls in between one seal protrusion 22c and the end 7a of the end member 7 to impair sealability between the seal protrusion 22e and the end 7a, the other seal protrusion 22f comes in close contact with the end 7a over the whole periphery so as to secure the sealability. Such seal protrusions 22e, 22f are provided in plural-layer construction to thereby greatly enhance the sealing performance as the whole seal lip 22b. Not only two but three seal protrusions 22e, 22f or more can be formed. The extreme end of the seal lip 22b is set to be protruded toward the end member 7 from the end portion 3b of the shell 3 and an extreme end 23e of a rigid member 23 described later, in a non-contact free state shown in FIG. 2 so that when the end member 7 moves, the seal protrusions 22e, 22f positively come in close contact with the end 7a of the end member 7.

Figure 5:
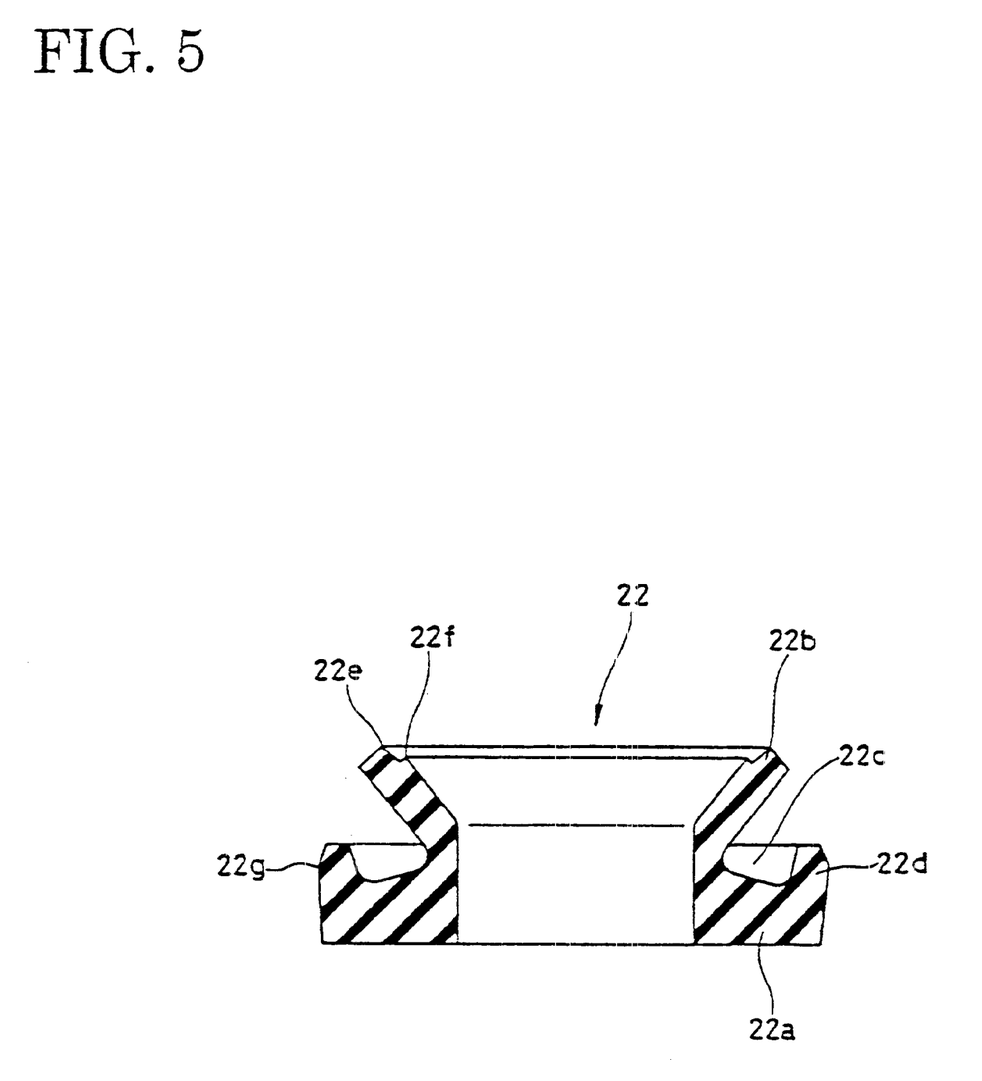
FIG. 5 is an enlarged sectional view of a seal member.

The outer peripheral seal lip 22d provided in the outer peripheral portion of the seal member 22 is pressed by pressure P of the pressure chamber 9 and pressed against the inner side of the seal mounting portion 3c. As shown in FIG. 5, the seal lip 22d is provided with an annular seal protrusion 22g projecting outward in a diametral direction so that contact surface pressure can be locally increased to sufficiently seal between it and the inner side of the seal mounting portion 3c.

The rigid member 23 is formed into cylindrical shape by predetermined metal or resin or the like as mentioned above, and a proximal end 23a thereof is pressed and fitted (interference) in the rigid member mounting portion 3d of the shell 3, the pressure introducing port 15 being communicated with the pressure chamber 9 through an inner peripheral space thereof. The extreme end 23b on the end member 7 side of the rigid member 23 is formed in the form of a divergent taper or a trumpet, and the outer peripheral surface 23c of the extreme end 23b is also formed in the form of a divergent taper or a trumpet. The extreme end 23b and the outer peripheral surface 23c are arranged on the inner peripheral side of the seal lip 22b of the seal member 22 whereby when the seal lip 22b tends to be pressed by high pressure on the pressure chamber 9 side and inverted, it comes in contact with the outer peripheral surface 23c of the extreme end 23b to prevent the inversion. Accordingly, as described above, the outer peripheral surface 23c of the extreme end 23b displays the action for backing up the seal lip 22b. While in a free state shown in FIG. 2, a gap 24 having a predetermined size is set between the outer peripheral surface 23c of the extreme end 23b and the inner peripheral surface of the seal lip 22b so that both the members are not in contact, it is to be noted that the gap 24 may not be provided, in which case both the members are always in contact. A tip 23d of the extreme end 23b is applied with a round in section so as not to scratch the seal lip 22b made of rubber. Further, in consideration of the wear prevention of the seal lip 22b caused by contact, a portion for supporting the seal lip 22b including the outer peripheral surface 23c of the extreme end 23b may be applied with coating such as resin or a protective ring (not shown) formed of resin or the like may be arranged at the end of the rigid member 23. The end 23e of the extreme end 23b is formed parallel with the end portion 3b of the shell 3. The end 23e is arranged at a position on the same level as the end portion 3b of the shell 3 so that the operating member 5 is not in strong contact therewith, or it is arranged at a positioned retreated from the end portion 3b so that the operating member 5 is not in contact therewith.

The end seal 21 constituted as described above is to seal, so that when the pressure in the pressure chamber 9 lowers as the pressure on the pressure pipe side lowers, the pressure in the pressure chamber 9 may not lower to a level below a predetermined value, said pressure. The end seal is characterized in that the following operation and effect are displayed by the above-described constitution.

That is, first, in a state that the seal member 22 is not mounted on the operating member 5 side which moves during operation but mounted on the seal mounting portion 3c of the end portion 3b of the shell 3 on the stationary side, and the end member 7 of the operating member 5 moving toward the end portion 3b comes in contact with the end portion 3a of the shell 3 and stops, the seal lip 22b of the seal member 22 of the end seal 21 is pressed by the pressure P of the pressure chamber 9 which is sealing fluid pressure into close contact with the end 7a of the end member 7 thereby achieving the sealing action. Therefore, sealing is not done in a state that the seal member 22 is strongly sandwiched between the rigid materials, but sealing is done in a state that the seal lip 22b of the seal member 22 is in close contact with the end 7a of the already stopped end member 7 under predetermined contact pressure. Accordingly, since the seal member 22 provided with the seal lip 22b is not strongly sandwiched between the rigid materials in a compressed state, it is possible to prevent an early occurrence of permanent set of fatigue in the seal member 22 whereby the stable sealing performance can be secured for a long period of time.

Further, since the outer peripheral surface 23c of the extreme end 23b of the rigid member 23 formed in the form of a divergent taper adjusting to the shape of the seal lip 22b is arranged on the inner peripheral side of the seal lip 22b of the seal member 22 formed to have an outward shape, the extreme end 23b or the outer peripheral surface 23c displays the action to backup the seal lip 22b. Accordingly, since the seal lip 22b is prevented from being pressed by high pressure on the pressure chamber 9 and inverted on the low pressure side or the inner peripheral side, the seal lip 22b can be always placed in contact with the end 7a of the end member 7 in a stable state. Accordingly, the sealing performance can be stabilized also from a viewpoint of this.

Further, as shown in the figure, since the maximum outside diameter dimension of the outer peripheral surface 23c of the extreme end 23b of the rigid member 23 formed into a divergent taper is set larger than the minimum inside diameter dimension of the seal member 22, the extreme end 23b or the outer peripheral surface 23c displays the anti-slip action for preventing the seal member 22 from being detached from the seal mounting portion 3c. Accordingly, even if the seal member 22 made of a rubber-like elastic material is mounted on the seal mounting portion 3c in a nonadhesive manner, the seal member 22 is not slipped out of the seal mounting portion 3c, and therefore the adhesive (baking) operation in mounting can be omitted. The mounting operation can be facilitated accordingly, and the end seal 21 which is also advantageous in terms of cost can be provided.

Furthermore, since the plurality of seal protrusions 22e, 22f are provided on the extreme end of the seal lip 22b, and the seal lip 22b is of substantially plural-stage construction, even if a difficulty caused by galling, of the foreign matter, or the like should occur in the sealing action by one seal protrusion, it is possible to maintain the sealing action by other seal protrusions. Accordingly, the sealing performance can be stabilized from a viewpoint of this also. In the case where when the lips are made substantially of plural stages, two stages are employed, the width (spacing) of each stage is set longer than the length or the diameter of the foreign matter 31 whereby either one stage maintains a contact state. In the case of three stages or more, the width (spacing) of each stage is set to the same as that of the aforesaid two stages, or the width of the whole contact portion of the seal lip 22b is set longer than the length or the diameter of the foreign matter 31 whereby any of stages maintain a contact state.

While in the present invention, the movement of the operating member 5 toward the end portion 3b is stopped, it is noted that the operating member 5 comes in contact with the end portion 3b and stops, and besides the construction in which it is stopped by a stopper not shown may be employed. In this case, the stopper comprises, for example, a protrusion provided on the end portion 3b toward the operating member 5, a spacer installed on the end portion 3b, and so on.

Embodiment 2

Further, it is contemplated that the annular or tubular rigid member 23 is secured to the shell 3 of the housing 2 by the construction or method as described below.

That is, in the case where the rigid member 23 is secured to the shell 3 by interference between the inside diameter of the rigid member mounting portion 3d of the shell 3 and the outside diameter of the rigid member 23 as in Embodiment 1, an inconvenience as described below possibly occurs.

(1) A tolerance range of the inside diameter dimension of the rigid member mounting portion 3d of the shell 3 and the outside diameter dimension of the rigid member 23 is set small, and these have to be molded with high accuracy, resulting in poor processability and disadvantageous cost.

(2) There is the possibility that the rigid member 23 is slipped out of the rigid member mounting portion 3d of the shell 3 due to vibrations or shocks or the like during the operation of the bellows 6.

(3) There is the possibility that at the time of interference (at the time of pressing-in), burr occurs to lead to a cause for generation of contamination.

As measures for these inconveniences described above, the rigid member 23 may be secured to the shell 3 by the construction or method as described below.

Figure 6:
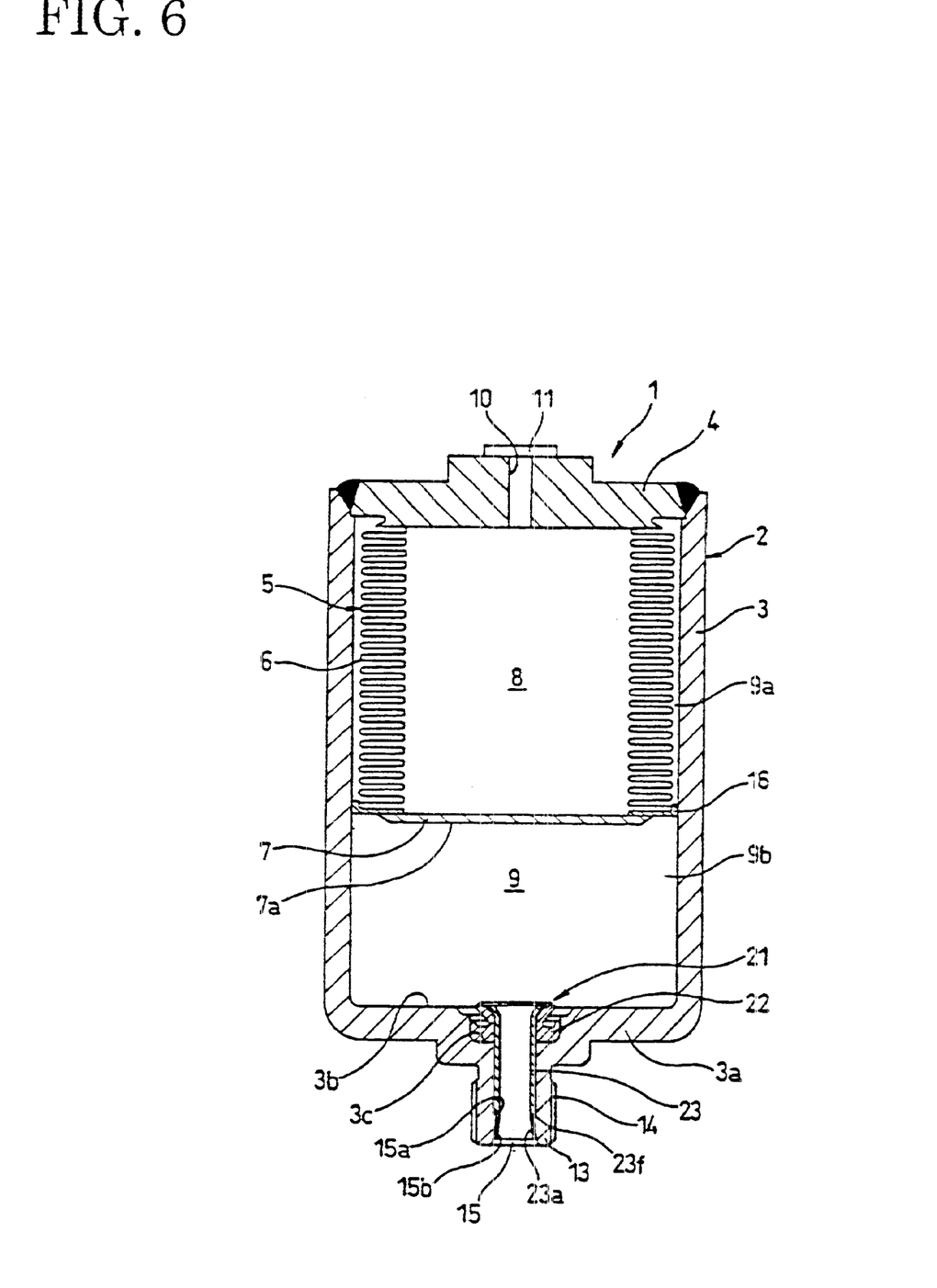
FIG. 6 is a sectional view of an accumulator having an end seal mounted thereon according to Embodiment 2 of the present invention.
Figure 7:
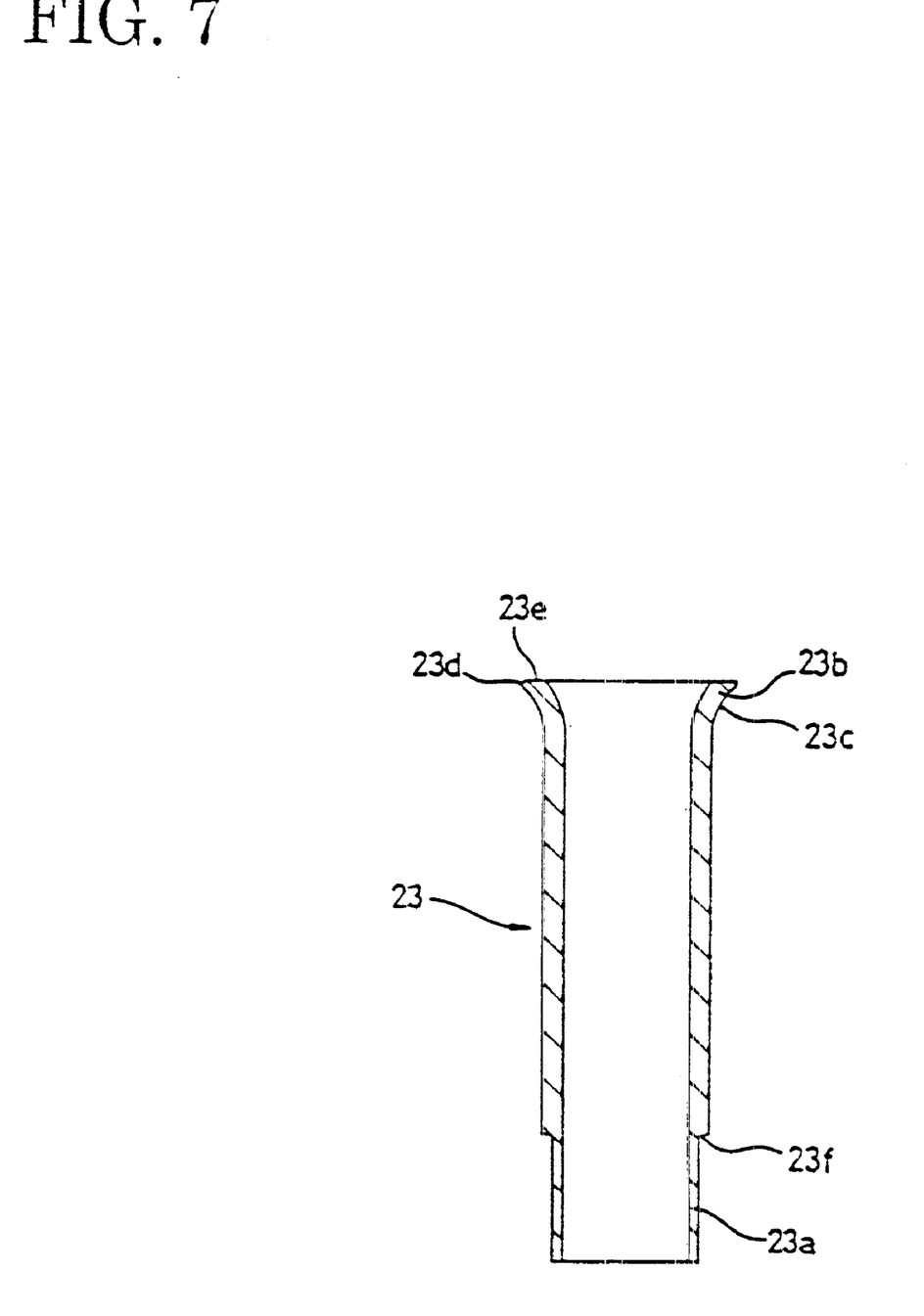
FIG. 7 is an enlarged sectional view of a rigid member.
Figure 8:
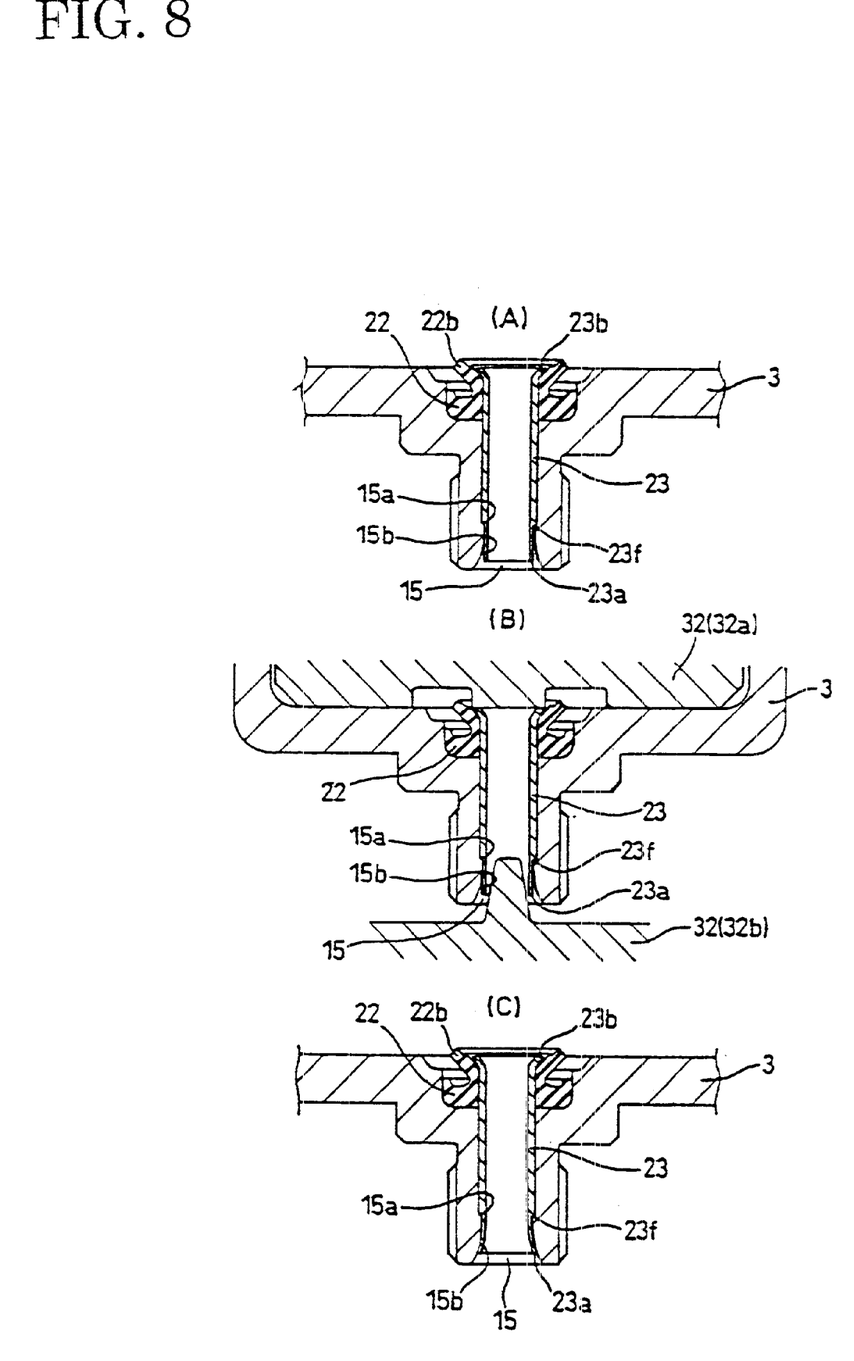

That is, as shown in FIGS. 6 to 8, the rigid member 23 is formed relatively long in a direction of the proximal end 23a, the rigid member 23 is inserted into the pressure introducing port 15 of the shell 3, a difference in level locating portion (also referred to as a level) 23f provided in advance on the outer peripheral surface of the rigid member 23 runs into a difference in-level locating portion (also referred to as a level) 15a provided in advance oppositely on the inner surface of the pressure introducing port 15 to thereby specify an inserting depth of the rigid member 23 (FIG. 8(A)), the proximal end 23a of the rigid member 23 is enlarged in diameter by means of a jig 32 after insertion (FIG.8(B)), and it is brought into engagement with a divergent tapered engaging portion 15b provided in advance on the inner surface of the pressure introducing port 15 to prevent the rigid member 23 from being slipped out of the pressure introducing port 15 (FIG. 8(C)). A proximal end (also referred to as an anti-slipout enlarged pipe portion) 23a of the rigid member 23 molded relatively thin by formation of the difference in level locating portion 23f is at the outset, molded in the form of a straight cylinder as shown in FIG. 7 or FIGS. 8(A) and (B), and deformed by means of the jig 32 into a divergent taper. The jig 32 used comprises a combination of a rigid member locating jig 32a and a enlarged pipe jig 32b.

The aforementioned securing construction can display the following operation and effect.

(1) The locating action by way of the mutual running of the difference in-level locating portion 23f provided on the outer peripheral surface of the rigid member 23 and the difference in-level locating portion 15a provided on the inner surface of the pressure introducing port 15 enables accurate provision of a height position of the extreme end 23b of the rigid member 23 with respect to the end portion 3a of the shell 3. Accordingly, it is possible to prevent the galling of the seal member 22 and the interference to the end member 7.

(2) The engaging action of the proximal end 23b of the rigid member 23 enlarged in diameter after insertion enables the securing of the rigid member 23 to the shell 3 in a strongly anti-slipout state. Accordingly, it is possible to positively prevent the rigid member 23 from being slipped out of the shell 3 due to vibrations or shocks or the like during the operation of the bellows 6.

(3) Since the rigid member 23 is secured to the shell 3 in accordance with the above (2), it is allowed that a clearance to some extent be set between the outer peripheral surface of the rigid member 23 and the inner surface of the pressure introducing port 15 of the shell 3. Accordingly, since the rigid member 23 need not be pressed into the pressure introducing port 15, it is possible to prevent contamination from generation.

(4) Since the rigid member 23 is likewise secured to the shell 3 in accordance with the above (2), it is allowed that a tolerance range of the outside diameter dimension of the rigid member 23 and the inside diameter dimension of the pressure introducing port 15 of the shell 3 be set large to some extent. Accordingly, the processability thereof can be enhanced, and it is advantageous in terms of cost also.

Effects of the Invention

The present invention displays the following effects.

In the end seal according to claim 1, first, the seal member is not mounted on the side of the operating member which moves during operation but mounted on the end portion on the stationary side, and in a state that the operating member moving toward the end portion comes in contact with the end portion and stops or in a state that it is stopped by a stopper, the seal lip of the seal member of the end seal is pressed by sealing fluid pressure and comes in close contact with the end member to thereby achieve the sealing action. Therefore, sealing is not done in a state that the seal member is strongly sandwiched between rigid materials but sealing is done in a state that the seal lip of the seal member comes in close contact with the already stopped end member under predetermined contact pressure. Accordingly, the seal member provided with the seal lip is not strongly sandwiched between the rigid materials in a compressed state, and therefore, it is possible to prevent an early occurrence of permanent set of fatigue in the seal member, whereby the stable sealing performance can be secured for a long period of time.

In the end seal according to claim 2, since the outer peripheral surface of the extreme end of the rigid member formed in the form of a divergent taper adjusting to the shape of the seal lip is arranged on the inner peripheral side of the seal lip of the seal member, the outer peripheral surface displays the action for backing up the seal lip. Accordingly, the seal lip is prevented from being pressed by sealing fluid pressure and inverted on the low pressure side or the inner peripheral side, thus making it possible to always place the seal lip in contact with the end member in a stable state. The sealing performance can be stabilized from a viewpoint of this also.

Further, the maximum outside diameter dimension of the outer peripheral surface of the extreme end of the rigid member formed in the form of a divergent taper is set larger than the minimum inside diameter dimension of the seal member, whereby the outer peripheral surface displays the anti-slipout action for preventing the seal member from being detached from the mounting portion of the end portion. Accordingly, since even if the seal member should be mounted on the mounting portion in a non-adhesive manner, the seal member is not slipped out of the mounting portion, it is possible to omit the adhesive operation in mounting. The mounting operation can be facilitated accordingly, and an end seal which is advantageous in terms of cost can be provided.

In the end seal according to claim 3, the seal member is inserted in a non-adhesive manner not into the operating member on the moving side but into the recessed seal mounting portion provided on the end portion of the housing which is on the stationary side, and in a state that the operating member moving toward the end portion comes in contact with the end portion and stops or in a state it is stopped by a stopper, the seal lip of the seal member of the end seal is pressed by sealing fluid pressure and comes in close contact with the end member to thereby achieve the sealing action. Therefore, sealing is not done in a state that the seal member is strongly sandwiched between the rigid materials but sealing is done in a sate that the seal lip of the seal member is in close contact with the already stopped end member under predetermined contact pressure. Accordingly, since the seal member provided with the seal lip is not strongly sandwiched between the rigid materials in compressed state, it is possible to prevent an early occurrence of permanent set of fatigue in the seal member, whereby the stable sealing performance can be secured for a long period of time. Further, since the divergent tapered extreme end located on the inner peripheral side of the seal lip to backup the seal lip and to prevent the seal member from slipping out of the seal mounting portion is provided on the annular rigid member secured to the housing on the inner peripheral side of the seal member, it is possible to prevent the seal lip from being inverted and the seal member from being detached from the mounting portion of the housing.

In the end seal according to claim 4, the locating action by way of the running of the difference in-level locating portion provided on the outer peripheral surface of the rigid member and the difference in-level locating portion provided on the inner surface of the fluid flow passage enables accurate provision of a height position of the rigid member with respect to the end portion of the housing. Accordingly, it is possible to prevent the galling of the seal member and the interference to the operating member 5.

In the end seal according to claim 5, the engaging action of the proximal end of the rigid member enlarged in diameter after insertion enables the securing of the rigid member to the housing in a strongly anti-slipout state. Accordingly, it is possible to positively prevent the rigid member from being slipped out of the housing due to vibrations or shocks or the like during the operation of the bellows. Further, it is allowed that a clearance to some extent be set between the outer peripheral surface of the rigid member and the inner surface of the fluid flow passage of the housing. Therefore, the rigid member need not be pressed into the fluid flow passage, thus making it possible to prevent contamination from generation. Further, it is allowed that a tolerance range of the outside diameter dimension of the rigid member and the inside diameter dimension of the fluid flow passage of the housing be set large to some extent. Therefore, the processability thereof can be enhanced, and it is possible to provide a seal product which is advantageous in terms of cost also.

What is claimed is:

1. An accumulator comprising:

a shell having a rigid closed end portion and an open end;

a cover member fixed to the open end of the shell so as to provide a housing;

an operating member provided in the housing;

the operating member having a rigid end member and a bellows with two ends, said one end of the bellows being secured to the cover member, and the other end of the bellows being secured to the end member, the housing has an interior which is divided by the bellows and the end member into an internal gas chamber and an external pressure chamber;

an end seal for sealing between the closed end portion and the operating member, the end seal having a seal member mounted on the closed end portion, the seal member being made of an elastic material and having a seal lip which is to be pressed by a fluid pressure so as to seal the end member of the operating member when the end member of the operating member comes into contact with the closed end portion; and the operating member further includes a slide member which slidably moves in the housing for guiding parallel movement of the rigid end member when the bellows expands and contracts.

2. The accumulator according to claim 1, wherein an annular rigid member is provided on an inner peripheral side of the seal member, and wherein an outer peripheral surface of an extreme end of the rigid member is arranged on an inner peripheral side of the seal lip of the seal member so as to be formed into a divergent tapered configuration adjusting to the shape of the seal lip.

3. The accumulator according to claim 2, wherein the rigid member is inserted into a fluid flow passage provided in the housing, and wherein a difference in-level locating portion provided on the outer peripheral surface of the rigid member runs into a difference in-level locating portion provided on an inner surface of the fluid flow passage to thereby specify an inserting depth of the rigid member.

4. The accumulator according to claim 2, wherein the rigid member is inserted into a fluid flow passage provided in the housing, and wherein a proximal end of the rigid member located forward in an inserting direction is enlarged in diameter after insertion so as to place it in engagement with the housing to thereby prevent the rigid member from being slipped out of the fluid flow passage.

5. The accumulator according to claim 1, wherein the rigid member is inserted into a fluid flow passage provided in the housing, and wherein a difference in-level locating portion provided on the outer peripheral surface of the rigid member runs into a difference in-level locating portion provided on an inner surface of the fluid flow passage to thereby specify an inserting depth of the rigid member.

6. The accumulator according to claim 1, wherein the rigid member is inserted into a fluid flow passage provided in the housing, and wherein a proximal end of the rigid member located forward in an inserting direction is enlarged in diameter after insertion so as to place it in engagement with the housing to thereby prevent the rigid member from being slipped out of the fluid flow passage.

7. An accumulator comprising:

a shell having a rigid closed end portion and an open end;

a cover member fixed to the open end of the shell so as to provide a housing;

an operating member provided in the housing;

the operating member having an a rigid end member and a bellows with two ends, said one end of the bellows being secured to the cover member, and the other end of the bellows being secured to the end member, the housing has an interior which is divided by the bellows and the end member into an internal gas chamber and an external pressure chamber;

an end seal for sealing between the closed end portion of the housing and the operating member, the end seal having a seal member, and an annular rigid member;

the seal member being inserted in a non-adhesive manner into a recessed seal mounting portion provided on the closed end portion;

the rigid member being secured to the housing on an inner peripheral side of the seal member;

the seal member being made of an elastic material and having a seal lip which is to be pressed by sealing fluid pressure into close contact with the operating member when the operating member comes into contact with the closed end portion;

the rigid member having a divergent tapered extreme end located on an inner peripheral side of the seal lip so as to backup the seal lip and prevent the seal member from being slipped out of the seal mounting portion; and the operating member further includes a sliding member which slidably moves in the housing for guiding parallel movement of the rigid end member when the bellows expands and contracts.

8. The accumulator according to claim 7, wherein the shell has a cylindrical inner surface on which the sliding member slides when the bellows expands and contracts.

9. The accumulator according to claim 1, wherein the shell has a cylindrical inner surface on which the sliding member slides when the bellows expands and contracts.

* * * * *